US011186214B2

(12) United States Patent
Das et al.

(10) Patent No.: US 11,186,214 B2
(45) Date of Patent: Nov. 30, 2021

(54) DOUBLE DECK TRUCK TRAILER WITH MOVABLE UPPER DECK

(71) Applicant: Amazon Technologies, Inc., Seattle, WA (US)

(72) Inventors: Vinay Das, London (GB); John Christopher James Barge, Swansea (GB); Darren Wells, Peterborough (GB)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 16/211,884

(22) Filed: Dec. 6, 2018

(65) Prior Publication Data

US 2020/0180491 A1    Jun. 11, 2020

(51) Int. Cl.
| | |
|---|---|
| *B60P 1/02* | (2006.01) |
| *B60P 1/43* | (2006.01) |
| *B62D 63/08* | (2006.01) |
| *B62D 53/06* | (2006.01) |

(52) U.S. Cl.
CPC .............. *B60P 1/02* (2013.01); *B60P 1/435* (2013.01); *B62D 63/08* (2013.01); *B62D 53/06* (2013.01)

(58) Field of Classification Search
CPC ....................................................... B60P 1/02
See application file for complete search history.

(56) References Cited

U.S. PATENT DOCUMENTS

| | | | | |
|---|---|---|---|---|
| 3,266,646 | A  * | 8/1966 | Byrne ................... | B60P 1/4421 414/545 |
| 4,701,086 | A  * | 10/1987 | Thorndyke ............... | B60P 1/02 105/371 |
| 5,443,350 | A  * | 8/1995 | Wilson ...................... | B60P 1/02 410/14 |
| 6,234,740 | B1 * | 5/2001 | Page ...................... | B60P 1/4435 414/545 |
| 7,665,788 | B2 * | 2/2010 | Dibdin ...................... | B60P 1/02 296/25 |
| 10,207,753 | B2 * | 2/2019 | O'Marra ............... | B62D 53/067 |
| 2003/0147734 | A1 * | 8/2003 | Adams ....................... | B60P 1/02 414/541 |
| 2018/0057081 | A1 * | 3/2018 | O'Marra ............... | B60P 1/6481 |

FOREIGN PATENT DOCUMENTS

EP    1380457 A2 *    1/2004    .............. B62D 33/04

* cited by examiner

*Primary Examiner* — Mark C Hageman
(74) *Attorney, Agent, or Firm* — BakerHostetler

(57) ABSTRACT

In one embodiment, a truck trailer has a cargo container that defines a cargo area therein. The trailer has a rear cargo lift having a platform disposed within the cargo area at a rear end of the trailer. The platform is vertically movable between a floor of the trailer and a first elevation that is above the floor. The trailer has an upper cargo deck supported within a portion of the cargo area that is between the rear lift and a front end of the trailer. The upper cargo deck divides the portion of the cargo area into upper and lower areas. The upper cargo deck can align with the rear cargo lift at the first elevation so as to receive cargo into the upper area, and translate the cargo to a second elevation that is above the first elevation so as to receive cargo in the lower area.

19 Claims, 6 Drawing Sheets

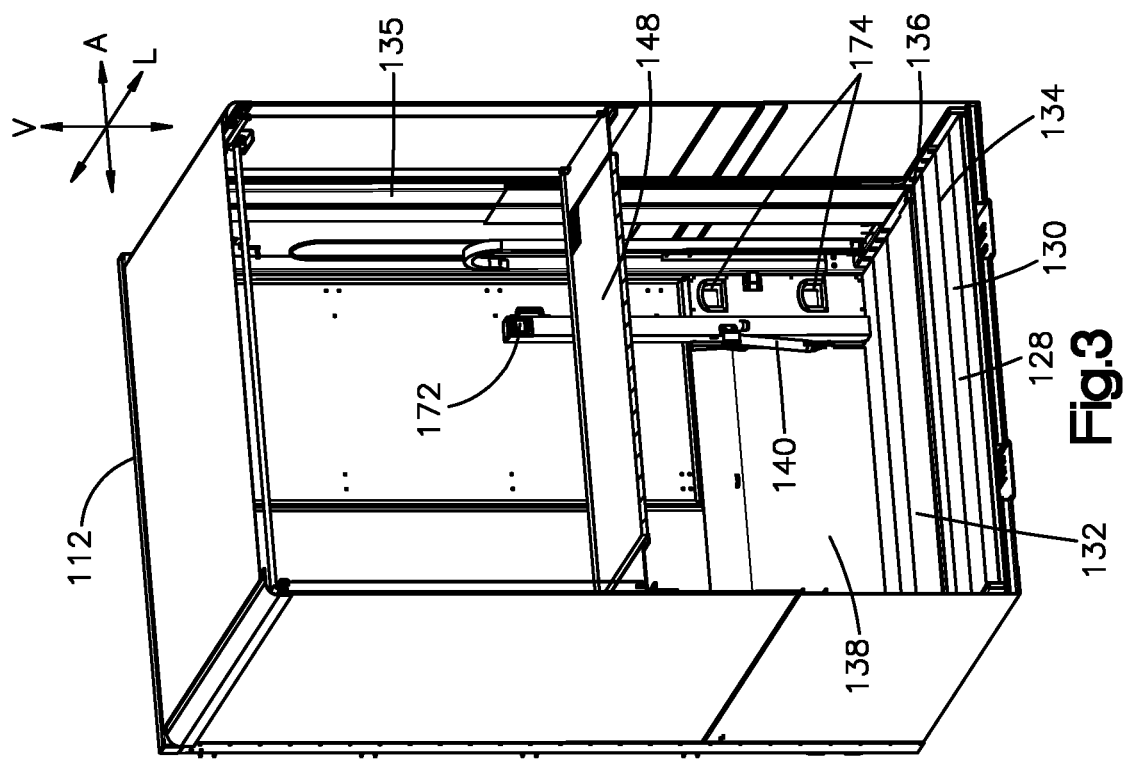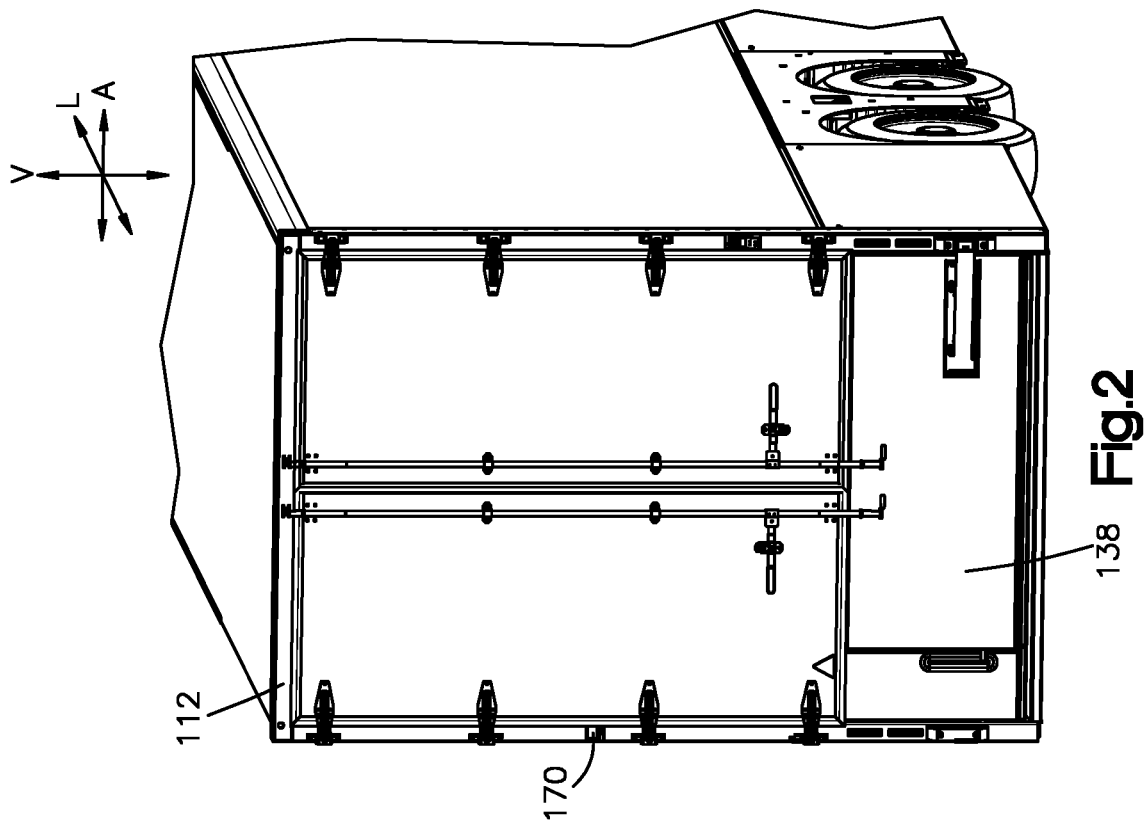

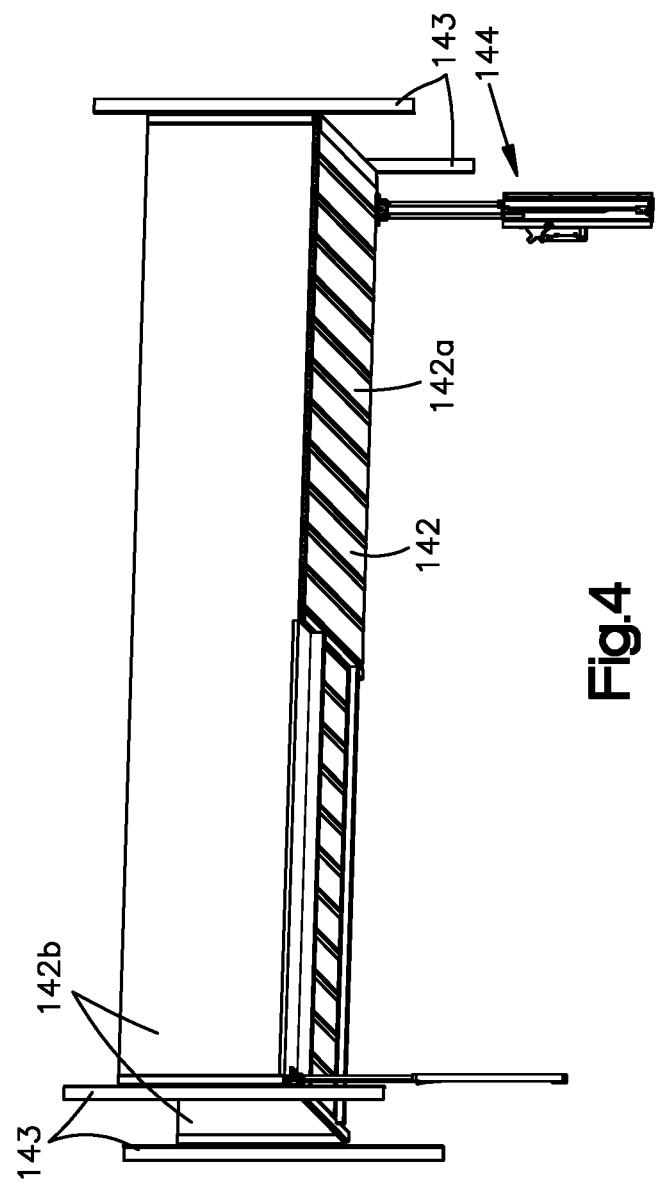
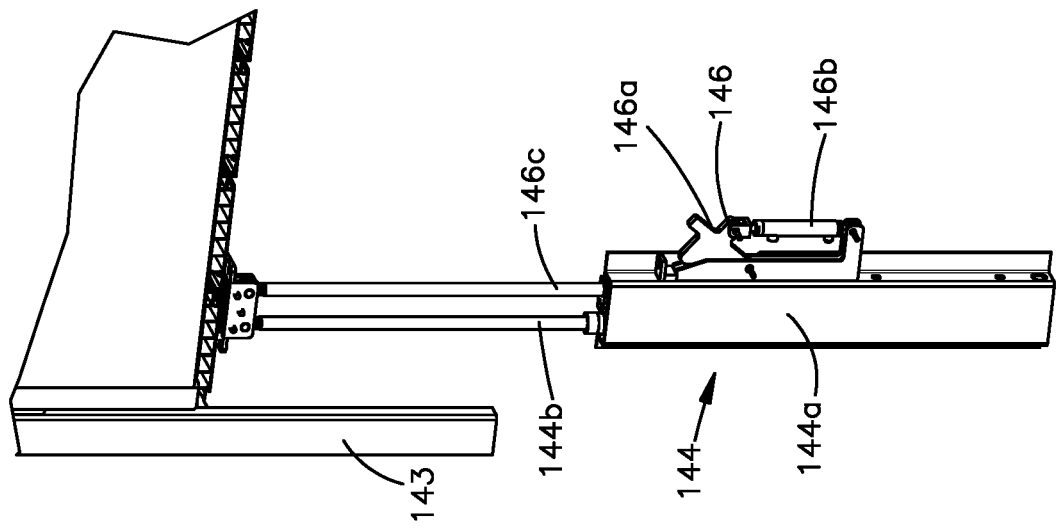

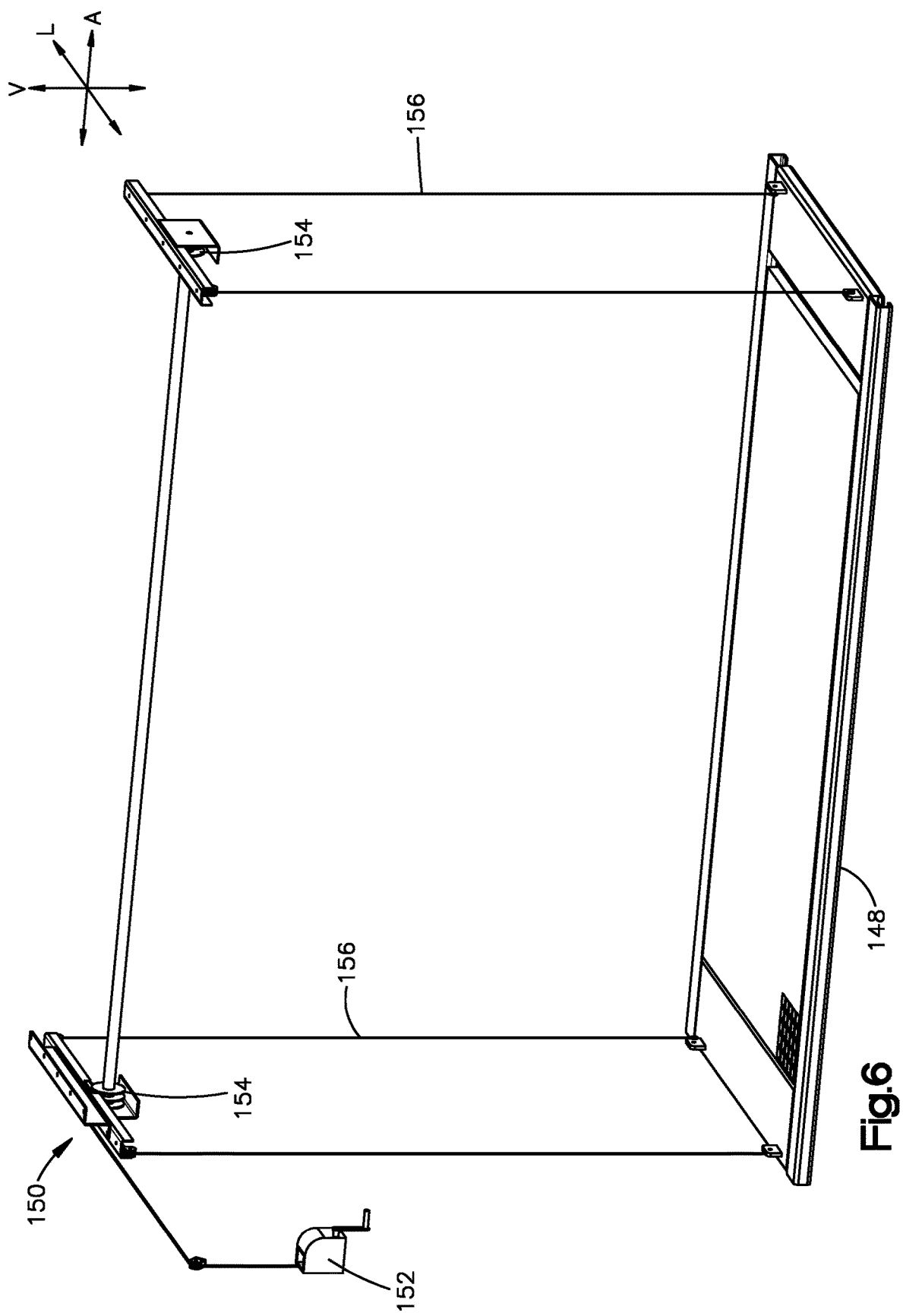

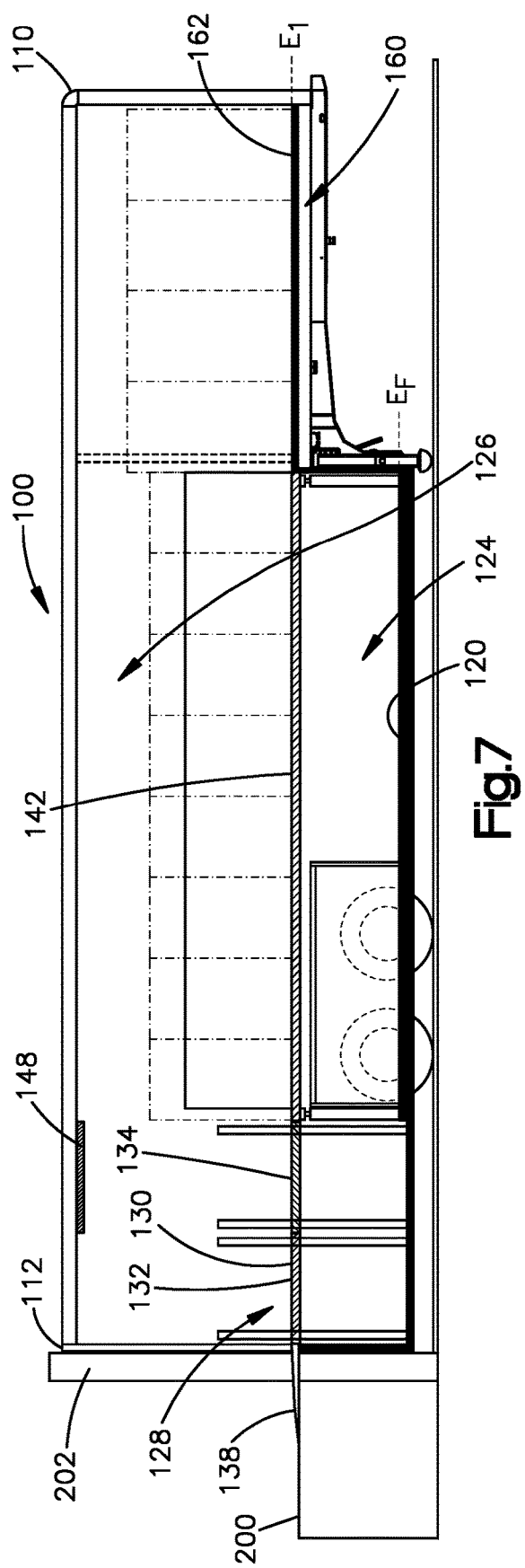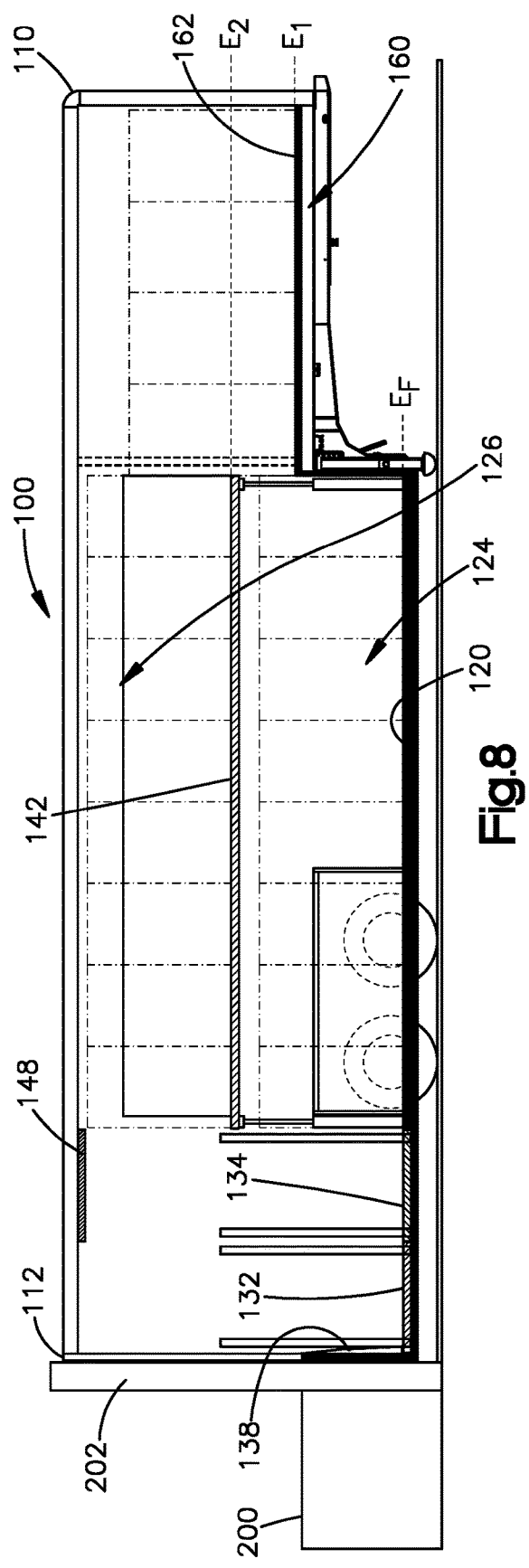

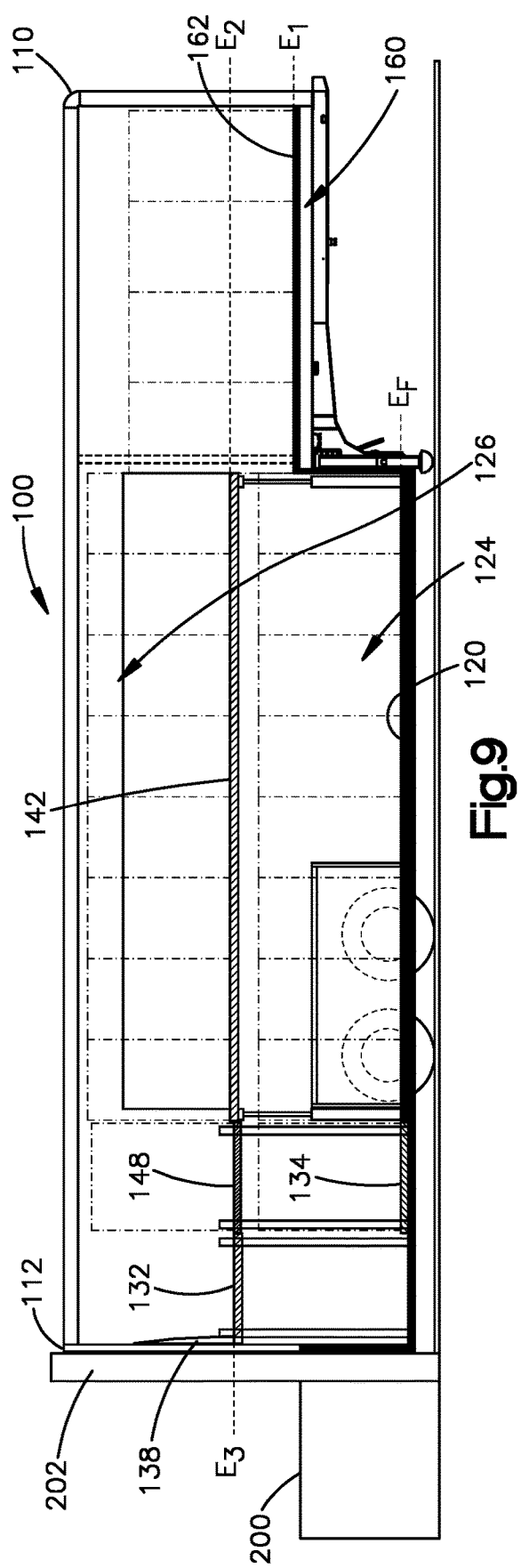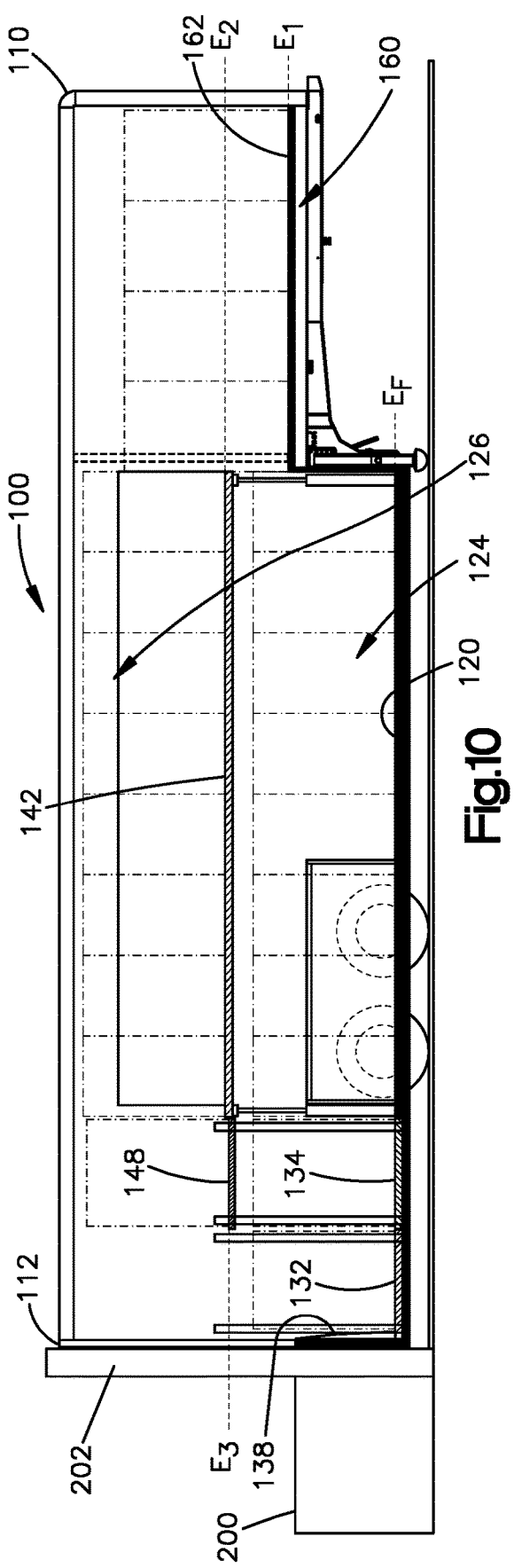

DOUBLE DECK TRUCK TRAILER WITH MOVABLE UPPER DECK

BACKGROUND

In the shipping and receiving industry, an unpowered trailer is commonly used to move cargo from one location to a desired destination. The trailer is loaded with cargo, such as pallets of goods, and is attached to a tractor unit that pulls the trailer to the desired destination. In some embodiments, the trailer can be a semi-trailer that has a rear axle but is devoid of a front axle. In other embodiments, the trailer can be a full trailer that has both front and rear axles. In either case, it is often desirable to load the trailer to as near as full capacity as possible. Fully utilizing the capacity of the trailer can reduce the number of trucks needed to ship goods, thereby reducing operating costs and reducing both traffic congestion on roads and $CO_2$ emissions.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 2 shows a perspective view of an exterior of a rear end of the truck trailer of FIG. 1;

FIG. 3 shows a perspective cross-sectional view of an interior of the rear end of the truck trailer of FIG. 1;

FIG. 4 shows a perspective view of an upper cargo deck of the trailer of FIG. 1 according to one embodiment, the upper cargo deck being isolated from the trailer for illustrative purposes;

FIG. 5 shows a perspective view of an actuator of the trailer of FIG. 1 that is configured to raise and lower the upper cargo deck of FIG. 4;

FIG. 6 shows a perspective view of a second upper cargo deck of the trailer of FIG. 1 according to one embodiment, the second upper cargo deck being isolated from the trailer for illustrative purposes;

FIG. 7 shows a schematic cross-sectional side view of the trailer of FIG. 1 that illustrates a step of loading pallets into a neck and an upper cargo deck of the trailer, where the upper cargo deck, the neck, and a rear cargo lift of the trailer are aligned along a first elevation;

FIG. 8 shows a cross-sectional schematic elevation view of the trailer of FIG. 1 that illustrates a step of loading pallets onto a floor of the trailer under the upper cargo deck, where the upper cargo deck is raised to a second elevation;

FIG. 9 shows a cross-sectional schematic elevation view of the trailer of FIG. 1 that illustrates a step of loading pallets onto and below a second upper cargo deck of the trailer, where the second upper cargo deck is disposed at a third elevation; and FIG. 10 shows a cross-sectional schematic elevation view of the trailer of FIG. 1 that illustrates a step of loading the rear cargo lift with a pallet, where the rear cargo lift is lowered to the floor of the trailer.

DETAILED DESCRIPTION

Figure 1:
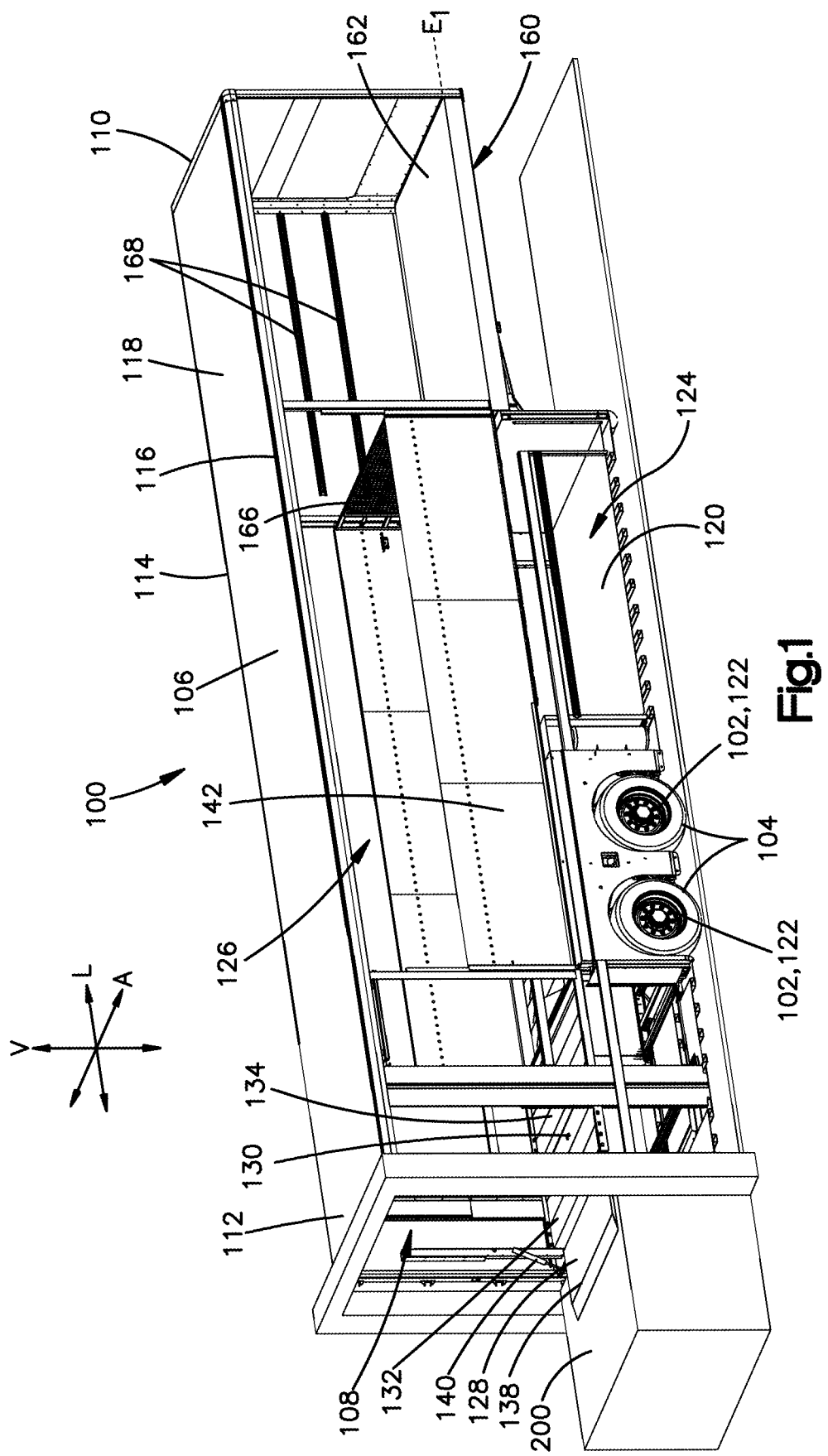
FIG. 1 shows a perspective view of a truck trailer docked at a shipping and receiving dock according to one embodiment, the truck trailer having a sidewall removed to show an interior of the truck trailer.

To more fully utilize a cargo area of a truck trailer, the trailer can be designed with upper and lower decks that can be independently loaded with cargo such as pallets of goods. However, some countries, such as countries in continental Europe, restrict the height of a trailer to four meters. This height restriction can limit the height of the upper cargo area above the upper deck and the lower cargo area above the lower deck, thereby making the decks difficult to load and limiting the height of the cargo that can be loaded into the upper and lower cargo areas.

To provide additional height to the overall cargo area of the trailer, the lower cargo area can be designed to extend down into an area between the right and left wheels of the trailer by splitting the axle or axles of the trailer. In other words, the trailer can be implemented with independent right and left axles, and the lower deck and at least a portion of the lower cargo area can be disposed between the right and left wheels. Disposing the lower deck between the wheels; however, may place the lower deck below the elevation of a standard shipping and receiving dock, thereby making it difficult to wheel the cargo from the dock onto the lower deck. Further, if the height of the cargo area is split evenly by the upper deck, then the upper deck may be positioned above the elevation of a standard shipping and receiving dock, thereby making it difficult to wheel the cargo from the dock onto the upper deck. Presented herein is a trailer having upper and lower cargo decks that can loaded from a standard shipping and receiving dock, and methods of loading and unloading the same.

Referring to FIG. 1, a truck trailer 100 is shown according to one embodiment. In general, the truck trailer 100 comprises at least one axle 102 that is configured to support at least one pair of wheels 104. The trailer 100 also comprises at least one cargo container 106 that is supported by (e.g., mounted on) the at least one axle 102 and that defines a cargo area 108 therein. As will be described in further detail below, the trailer 100 has a plurality of decks disposed in the cargo area 108 that can be aligned along a first elevation $E_1$ so as to form a continuous surface upon which cargo can be wheeled from a shipping and receiving dock 200 into the trailer 100. At least one of the decks can be loaded with cargo and then moved from the first elevation $E_1$ to a second elevation $E_2$, above the first elevation $E_1$, so that cargo can be loaded below the deck. As such, the trailer 100 has upper and lower decks, and can therefore be considered to be a double deck trailer.

Referring more specifically to the details of the trailer 100, the cargo container 106 has a front end 110, and a rear end 112 that is opposite the front end 110 along a longitudinal direction L. The front end 110 can include a front wall, and the rear end 112 can include at least one door. The at least one door can be, for example, a roll-up door, a swing open door, or a pair of swing open doors. The cargo container 106 has a first side 114, and a second side 116 that are spaced opposite from one another along a lateral direction A, perpendicular to the longitudinal direction L. In some embodiments, at least one of the first and second sides 114 and 116 can include a sidewall. For example, the cargo container 106 can be a cargo box, and each of the first and second sides 114 and 116 can include a sidewall. In other embodiments, at least one of the first and second sides 114 and 116 can include a curtain. For example, the cargo container 106 can be a Tautliner or curtainsider, and each of the first and second sides 114 and 116 can include a curtain.

The cargo container 106 has a top wall 118, and a floor 120 that is spaced opposite from the top wall 118 along a vertical direction V, perpendicular to both the longitudinal direction L and the lateral direction A. The floor 120 can be at a floor elevation $E_F$ that is below the first elevation $E_1$ and below the elevation of a standard shipping and receiving dock. The cargo container 106 can define the cargo area 108 between the front and rear ends 110 and 112, between the first and second sides 114 and 116, and between the top wall 118 and floor 120.

The at least one axle 102 can include at least one rear axle 122 that is oriented closer to the rear end 112 of the trailer 100 than it is to the front end 110. Each rear axle 122 is configured to support at least one wheel 104. In at least some embodiments, the at least one rear axle 122 includes at least one pair of rear axles 122 that are spaced from one another along the lateral direction A. In some embodiments, the at least one rear axle 122 can include two pairs of rear axles 122, where the pairs of rear axles 122 are spaced from one another along the longitudinal direction L. Each pair of rear axles 122 can support a pair of wheels 104 such that the pair of wheels are spaced from one another along the lateral direction A. The trailer 100 can include, for each pair of rear axles 122, a pair of independent rear suspensions, each including a respective one of the rear axles 122 of the pair. The pair of rear suspensions, and hence the pair of rear axles 122, can be space entirely from one another so as to define a gap therebetween and can operate independently of one another. Each rear suspension can be an adjustable suspension, such as an air or hydraulic suspension, that can be adjusted to raise or lower the rear end 112 of the trailer. Each rear suspension can be configured to raise or lower the rear end 112 depending on a height of the dock 200 to which the trailer 100 is engaged.

A portion of the cargo area 108 can be aligned between each pair of wheels 104 with respect to the lateral direction A when the wheels 104 are supported by the rear axles 122. For example, a straight line that extends from one of the wheels 104 in a pair to the other wheel 104 of the pair can intersect the cargo area 108. In some embodiments, a portion of the cargo area 108 can be disposed between each pair of rear axles 122 such that a straight line that extends from one of the axles 122 in the pair to the other axle 122 of the pair intersects the cargo area 108. As such, the floor 120 of the cargo container 106 can be disposed at an elevation that is below the top of the wheels 104, such as below the axles 102, along the vertical direction V.

In some embodiments, the trailer 100 can be a semi-trailer that is devoid of a front axle that is oriented closer to the front end 110 of the trailer 100 than it is to the rear end 112. In alternative embodiments, the trailer 100 can be a full trailer that includes at least one front axle (not shown) that is closer to the front end 110 of the trailer than it is to the rear end 112.

The trailer 100 includes a rear cargo lift 128 having a platform 130 that is disposed within the cargo area 108 at the rear end 112. The platform 130 can have a substantially planar shape that defines an upper surface that is configured for cargo to be carried rolled thereon. The platform 130 is configured to move, such as translate, up and down along the vertical direction V between the floor 120 and the first elevation $E_1$. The first elevation $E_1$ can be spaced above the floor 120 of the cargo container 106 by between about 1.15 meters and about 1.3 meters. For example, the first elevation E can be approximately 1.185 meters. The first elevation $E_1$ can be, for example, about the elevation of a standard shipping and receiving dock plus a height of the platform 130. The height of a standard shipping and receiving dock can be between about 0.9 meters and about 1.4 meters from the ground, and in some cases between about 1.1 meters and about 1.3 meters from the ground. It will be understood that the first elevation $E_1$, and the second and third elevations $E_2$ and $E_3$ discussed herein, might not be level with the ground. This may be due to differences in wheel pressure and/or differences in the height adjustment of the rear suspension. Thus, it will be understood that at least a portion of the first elevation E can be about the elevation of a standard shipping and receiving dock plus a height of the platform 130.

With reference to FIG. 3, in some embodiments, the platform 130 can be divided into a first platform section 132 and a second platform section 134. The first platform section 132 can be disposed along a rearward direction from the second platform section 134. The second platform section 134 can be disposed along a forward direction from the first platform section 132. As used herein, the term "forward" refers to a direction that extends from the rear end 112 of the trailer 100 to the front end 110 of the trailer 100, and the term "rearward" refers to a direction that extends from the front end 110 of the trailer 100 to the rear end 112 of the trailer 100. Each of the first and second platform sections 132 and 134 can have a forward end and a rearward end that are offset from one another along the longitudinal direction L. The forward end of the first platform section 132 can be removeably coupleable to the rearward end of the second platform section 134. Thus, the first and second platform sections 132 and 134 can be selectively coupled to one another and selectively separated from one another.

The trailer 100 can include an actuator 135 that is configured to drive at least a portion of the platform 130 to translate up and down along the vertical direction V. For example, the trailer 100 can include an actuator 135 that is configured to drive the first platform section 132 to translate up and down. Thus, the first platform section 132 can be an active platform that is driven by the actuator. The second platform section 134 can be a passive platform that is not driven by its own actuator. The second platform section 134 can be configured to passively translate up and down with corresponding translation of the first platform section 132 when the second platform section 134 is coupled to the first platform section 132. Further, the first platform section 132 can be configured to translate up and down independently of the second platform section 134 when the second platform section 134 is separated from the first platform section 132. It will be understood that, in alternative embodiments, the platform 130 need not be divided into first and second platform sections 132 and 134. Further, in alternative embodiments, the trailer 100 can include an actuator that is configured to drive the second platform section 134 to translate up and down along the vertical direction V.

In some embodiments, the trailer 100 can be configured such that the second platform section 134 can only be separated from the first platform section 132 when the first and second platform sections 132 and 134 are positioned at the floor 120 of the trailer 100. This can be a precaution to prevent the first and second platform sections 132 and 134 from being split while the first and second platform sections 132 and 134 are translating up or down, which could otherwise cause the cargo (e.g., pallets) to tip as the platforms go out of alignment.

In some embodiments, the trailer 100 can include a sensor 136 that that is configured to detect the presence or absence of objects crossing the forward end of the first platform section 132. The sensor 136 can be a retroreflective sensor that transmits a light beam across the forward end of the first platform section 132 along the lateral direction A, and that detects an object when the light beam is broken by the object. In alternative embodiments, the sensor 136 can be any other suitable sensor that can detect the presence or absence of objects crossing the forward end of the first platform section 132. The sensor 136 can be activated when the first and second platform sections 132 and 134 are separated from one another. Further, the trailer 100 can be configured to cut power to the actuator 135 of the first platform section 132 when the sensor 136 detects an object so as to stop movement of the first platform section 132.

The rear cargo lift 128 can comprise a ramp 138 that is coupled to the platform 130. For example, the ramp 138 can be coupled to a rearward end of the platform 130, such as a rearward end of the first platform section 132. The ramp 138 can be coupled to the platform 130 such that translation of the platform 130 up and down causes a corresponding upward and downward translation of the ramp 138. The ramp 138 can have a substantially planar shape that defines an upper surface that is configured for cargo to be carried or rolled thereon.

The ramp 138 can be configured to rotate between an extended position, wherein the ramp 138 extends outward from the rear end 112 of the cargo container 106 along the longitudinal direction L, and a retracted position, wherein the ramp 138 is retracted relative to the rear end 112. For example, in the extended position, the upper surface of the ramp 138 can extend along a direction that is more horizontal than vertical, and the upper surface of the ramp 138 can face upwards. In the retracted position, the upper surface of the ramp 138 can extend along a direction that is substantially vertical, and the upper surface of the ramp 138 can face inwards. The ramp 138 can be configured to rotate about an axis that extends along the lateral direction A so as to move between the retracted and extended positions. As used herein, the term "outward" refers to a direction that extends from the cargo area 108 to an area outside of the cargo container 106, and the term "inward" refers to a direction that extends from an area outside of the cargo container 106 to the cargo area 108. The trailer 100 can include an actuator 140 that is configured to rotate the ramp 138 between the extended and retracted positions. The actuator 140 can be a pneumatic actuator, a hydraulic actuator, or any other suitable actuator that can rotate the ramp 138.

Turning to FIGS. 1, 4, and 5, the trailer 100 includes an upper cargo deck 142 supported within a portion of the cargo area 108 that is between the rear cargo lift 128 and the front end 110. The upper cargo deck 142 divides the portion of the cargo area 108 into an upper cargo area 126, and a lower cargo area 124 that is disposed below the upper cargo area 126. At least a portion of the lower cargo area 124 can be disposed below the first elevation $E_1$, such as below an elevation of a shipping and receiving dock. The upper cargo deck 142 can be configured and rated to support a two ton powered industrial transport (PIT) Forktruck.

The upper cargo deck 142 is configured to translate between the first elevation $E_1$ and a second elevation $E_2$ that is above the first elevation $E_1$. For example, the upper cargo deck 142 can be configured receive cargo when the upper cargo deck 142 is at the first elevation $E_1$, and can be configured translate the cargo to the second elevation $E_2$. Further, the upper cargo deck 142 can be configured to carry cargo when the upper cargo deck 142 is at the second elevation $E_2$, and can be configured to translate the cargo to the first elevation E so that the cargo can be unloaded. Thus, the upper cargo deck 142 can be raised to thereby decrease a height of the upper cargo area 126 and increase a height of the lower cargo area 124, and can be lowered to thereby increase a height of the upper cargo area 126 and decrease a height of the lower cargo area 124. The second elevation $E_2$ can be between about 1.8 meters and about 2.4 meters from the floor 120. In one example, the second elevation $E_2$ can be 1.925 meters from the floor 120.

The upper cargo deck 142 can have a floor 142a that has a substantially planar shape that defines an upper surface that is configured for cargo to be carried or rolled thereon. The floor 142a of the upper cargo deck 142 can be elongated along the longitudinal direction L. The trailer 100 can have a length from the front end 110 to the rear end 112, and the upper cargo deck 142 can have a length that is at least 50 percent of the length of the trailer 100, such as at least 55 percent, at least 60 percent, at least 65 percent, at least 70 percent, or at least 75 percent. In some embodiments, the upper cargo deck 142 can have a pair of sidewalls 142b that are offset from one another along the lateral direction A. The pair of sidewalls 142b can extend upwards from the upper surface of the upper cargo deck 142. In some embodiments, the trailer 100 can include a plurality of rails 143, and the upper cargo deck 142 can be configured to translate up and down the rails 143. The upper cargo deck 142 can include hardware, such as Loadlok rails, that is mounted to at least one, such as both, of the sidewalls 142b. The hardware can be configured to secure the cargo to the at least one sidewall 142b.

The trailer 100 can include at least one actuator 144 that is configured to raise and lower the upper cargo deck 142. The at least one actuator 144 can be, for example, a hydraulic ram, or any other suitable actuator that can translate the upper cargo deck 142 upwards and downwards. The hydraulic ram can have a housing 144a and a shaft 144b that extends from, and retracts into, the housing 144a along the vertical direction V. The shaft 144b can be coupled to the upper cargo deck 142, such as to the floor 142a of the upper cargo deck 142, such that, when the shaft 144b extends and retracts, the shaft 144b moves the upper cargo deck 142 along the vertical direction V between the first and second elevations $E_1$ and $E_2$.

The trailer 100 can include at least one lock 146, such as a hydraulic lock, that is configured to lock the upper cargo deck 142 in position when the upper cargo deck 142 is at the second elevation $E_2$ so as to prevent the upper cargo deck 142 from falling. Each lock 146 can include a paddle 146a that can be deployed at a corner of the upper cargo deck 142 so as to lock the upper cargo deck 142 at the second elevation $E_2$. Each lock 146 can include an actuator 146b, such as a hydraulic actuator or any other suitable actuator, that is configured to move the lock 146 between locked and unlocked positions. Each lock 146 can also include a shaft 146c having an upper end attached to the upper cargo deck 142, and a lower end opposite the upper end. The paddle 146a can be configured to rotate such that an engagement surface of the paddle 146a forms an interference with the lower end of the shaft 146c (in FIG. 5, the engagement is made within the housing 144a), thereby preventing the shaft 146a, and consequently the upper cargo deck 142, from lowering. Each paddle 146a can be used as a backup should the actuator 144 fail. When the paddle 146a is moved into a locked position, the engagement surface of the paddle 146a can contact the lower end of the shaft 146c. Alternatively, the paddle 146a can be disposed just below the lower end of the shaft 146c so as to form a small gap between the paddle 146a and the shaft 146c, such that the upper cargo deck 142 is supported just by the at least one actuator 144, and the paddle 146a is positioned to break a descent of the shaft 146c should the actuator 144 fail. Further, each lock 146 can be spring operated such that the lock 146 deploys in the event that power to the lock 146 should fail. Thus, each lock 146 can default to a normally locked position. It will be understood that the lock 146 can be implemented as any other suitable lock that can prevent the upper cargo deck 142 from lowering and is not limited to the particular lock shown.

The trailer 100 can include a sensor for each lock 146 that can detect whether the paddle is in the locked position. A control panel can display whether each lock 146 is or is not in the locked position based on a reading of the sensor. In embodiments where the at least one actuator 144 is a hydraulic ram, the actuator 144 can include a burst valve (not shown) that can lock a position of the upper cargo deck 142 in the event that a hose supplying the actuator 144 bursts.

Referring to FIGS. 3 and 6, in some embodiments, the trailer 100 can comprise a second upper cargo deck 148. The second upper cargo deck 148 can be supported in a portion of the cargo area 108 that is between the upper cargo deck 142 and at least a portion of the platform 130. For example, the second upper cargo deck 148 can be supported in a portion of the cargo area 108 that is between the upper cargo deck 142 and the first platform section 132 of the platform 130. Further, the second upper cargo deck 148 can be supported in a portion of the cargo area 108 in which the second platform section 134 is supported. For instance, the second upper cargo deck 148 can be disposed over the second platform section 134 when the second platform section 134 is positioned at the floor 120 and the second upper cargo deck 148 is in a deployed position.

The second upper cargo deck 148 can have a substantially planar shape that defines an upper surface that is configured for cargo to be carried or rolled thereon. The second upper cargo deck 148 is configured to transition between a deployed position and a retracted position. In the deployed position, the second upper cargo deck 148 is configured to support cargo such as a pallet of goods. For example, in the deployed position, the upper surface of the second upper cargo deck 148 can face upwards, and can be spaced from the top wall 118. In the retracted position, the second upper cargo deck 148 is positioned out of the way so that the upper cargo deck 142 can be loaded. In other words, in the retracted position, the upper cargo deck 142 is moved from a pathway in which the upper cargo deck 142 is loaded (i.e., in a pathway that extends from the rear end 112 of the trailer 100 to the upper cargo deck 142). For example, in the deployed position, the second upper cargo deck 148 can be positioned at the top of the trailer 100 as shown in FIG. 7.

The second upper cargo deck 148 can be configured to move, such as translate, up and down along the vertical direction V between a third elevation $E_3$ and the top wall 118. The third elevation $E_3$ can be above the first elevation $E_1$ and can be above, below, or level with the second elevation $E_2$. For example, the third elevation $E_3$ can be between about 1.2 meters and about 2.0 meters from the floor 120. In one example, the third elevation $E_3$ can be 1.72 meters from the floor 120.

The trailer 100 can include at least one actuator 150 that is configured to drive the second upper cargo deck 148 to translate up and down along the vertical direction V. The at least actuator 150 can be any suitable actuator that can cause the second upper cargo deck 148 to translate up and down. For example, the at least one actuator 150 can comprise a pulley system. The pulley system can include a motor or hand winch 152, at least one pulley 154, and at least one cable 156 that extends from the at least one pulley 154 to the second upper cargo deck 148. The pulley system can be configured such that cranking of the hand winch 152 (or activation of the motor) in a first rotational direction causes the at least one pulley 154 to turn so as to wind the at least one cable 156, thereby lifting the second upper cargo deck 148. Further, cranking of the hand winch 152 (or activation of the motor) in a second rotational direction, opposite the first rotational direction, causes the at least one pulley 154 to turn in an opposite direction so as to unwind the at least one cable 156, thereby lowering the second upper cargo deck 148.

The at least one pulley 154 can include at least first and second pulleys 154 that are offset from one another along the lateral direction A, and the at least one cable 156 can comprise at least first and second cables 156 that extend from the first and second pulleys 154, respectively, to the second upper cargo deck 148. The pulley system can include a shaft 158 that rotationally couples the first and second pulleys 154 to one another such that rotation of one of the shaft 158, the first pulley 154, and the second pulley 154 causes a corresponding rotation of the others of the shaft 158, the first pulley 154, and the second pulley 154. Each cable 156 can extend from one of the pulleys 154 to a respective corner of the second upper cargo deck 148.

Although FIG. 6 shows one specific example of a pulley system, it will be understood that the pulley system can be implemented in a manner other than that shown. Further, it will be understood that the at least one actuator 150 can include an actuator other than a pulley system, such as a hydraulic ram or any other suitable actuator that can move the second upper cargo deck 148 up and down. It will be also be understood that the second upper cargo deck 148 can be implemented in a manner other than that shown. For example, the second upper cargo deck 148 can comprise a pair of platforms, each of which folds down from one of the sides 114 and 116 of the cargo container 106 to the third elevation $E_3$.

Returning to FIG. 1, in some embodiments, such as where the trailer 100 is a semi-trailer without a front axle, the cargo container 106 can include a neck 160 that extends from the front end 110 towards the rear end 112. The neck 160 can have a floor 162 that is at an elevation that is above the floor 120. For example, the floor 162 of the neck 160 can be at the first elevation $E_1$. The neck 160 is configured to couple to a fifth wheel coupling of a tractor unit. For example, the neck 160 can have a king pin 164 (labeled in FIG. 7) that extends downward from the floor 162. The neck 160 can extend from the floor 162 to the top wall 118, and from the front wall of the front end 110 towards the upper cargo deck 142. The neck 160 can define a neck cargo area 161 between the floor 162 and the top wall 118, and between the front wall of the front end 110 and the upper cargo deck 142. The trailer 100 can include a gate 166 that can be closed between the neck 160 and the upper cargo deck 142 so as to prevent cargo from shifting from one of the neck 160 and the upper cargo deck 142 to the other during transport. The neck 160 can include hardware 168, such as Loadlok rails, that is mounted to at least one, such as both, of the sides 114 and 116. The hardware can be configured to secure the cargo to the at least one side 114 and 116 within the neck cargo area 161.

Turning to FIGS. 2 and 3, the trailer 100 can comprise at least one control panel configured to control movement of at least one of (i) vertical translation of the platform 130 of the rear cargo lift 128, (ii) rotation of the ramp 138, (iii) vertical translation of the upper cargo deck 142, and (iv) movement of the second upper cargo deck 148 between the deployed and retracted configurations. The at least one control panel can include an exterior control panel 170. The exterior control panel 170 can be disposed at an exterior surface at the rear end 112 of the cargo container 106, and can be accessed from an exterior of the cargo container 106. Additionally or alternatively, the at least one control panel can include an interior control panel 172. The interior control panel 172 can be disposed at an interior surface at the rear end 112 of the cargo container 106, and can be accessed from an interior of the cargo container 106. Each control panel can include controls that can be engaged by an operator so as to control movement of the various components of the trailer 100. In at least some embodiment, each control panel can also include a display to display various information about the trailer 100 such as a status of the sensor 136 or a position of the locks 146.

The cargo container 106 can also include stairs 174 disposed at an interior surface at the rear end 112 of the cargo container 106. The stairs 174 can be used to exit the cargo area 108 in the event that power to the rear cargo lift 128 is disabled.

Turning now to FIGS. 7 to 10, a method of loading cargo onto the trailer 100 will now be described. The trailer 100 can be backed up to the dock 200 with the doors in the closed position. The suspension of the trailer 100 can be adjusted based on a height of the dock 200 such that the ramp 138 will rest on the dock 200 when the ramp 138 is extended. If the dock 200 is a flush type loading dock as shown in FIGS. 7 to 10, the rear end 112 of the trailer 100 can be brought into contact with the dock walls or dock seal 202 that is disposed around the dock entry, so as to form a seal between the trailer 100 and the dock 200 that shields the cargo area 108 of the trailer 100 from environmental conditions. Further, bringing the trailer 100 flush with the dock 200 can limit, an perhaps eliminate altogether, any gap between the trailer 100 and the dock 200. The doors can then be opened, and the trailer 100 can be plugged into a power supply using, for example, and Anderson connector, thereby providing power to the at least one control panel.

As shown in FIG. 7, the upper cargo deck 142 of the trailer 100 is aligned with the rear cargo lift 128 of the trailer 100 along the first elevation $E_1$ within the cargo area 108 of the trailer 100. This alignment step can comprise aligning the upper cargo deck 142 and the rear cargo lift 128 with the neck floor 162 of the neck 160 in embodiments that employ the neck 160. This alignment step can also comprise rotating the ramp 138 from a retracted position to an extended position, where the ramp 138 extends outwardly from the rear end 112 of the trailer 100 and rests on a shipping and receiving dock 200. Thus, the ramp 138 can be used in lieu of separate bridging equipment that would otherwise be used to extend from the surface of the dock 200 to the trailer 100. In addition, the trailer suspension can be adjusted to raise or lower the trailer 100 so as to position the ramp 138 on the dock 200 as needed. Adjustment of the suspension can be performed before or after the trailer 100 engages the dock 200. Note that the steps of aligning the upper cargo deck 142 and the rear cargo lift 128 can be skipped if they are already aligned.

With the upper cargo deck 142 and the rear cargo lift 128 aligned, first cargo, such as a first pallet or pallets of goods, are moved across the rear cargo lift 128 and onto the upper cargo deck 142. The cargo can be moved, such as rolled or translated, from the dock 200 along the upper surfaces of the rear cargo lift 128 and the upper cargo deck 142 using a dolly, hand truck, or pallet truck. The cargo can be moved one pallet, or just a few pallets, at a time. The first cargo can be stowed in the trailer 100 in an order that extends from the front end 110 of the trailer 100 and towards the rear end 112 of the trailer. Thus, in embodiments that employ the neck 160, the first cargo can be loaded into the neck 160 before loading the first cargo onto the upper cargo deck 142. Once the neck 160 is full, the gate 166 (shown in FIG. 1) can be closed between the neck 160 and the upper cargo deck 142, and the upper cargo deck 142 can be loaded.

The upper cargo deck 142 is then raised within the cargo area 108 to a second elevation $E_2$, above the first elevation $E_1$, as shown in FIG. 8. The exterior control panel 170 can be used to raise the upper cargo deck 142. Once the upper cargo deck 142 is raised, the locks 146 can be deployed to lock the position of the upper cargo deck 142 at the second elevation $E_2$. A status of the locks 146 can be indicated on at least one of the exterior and interior control panels 170 and 172.

In FIG. 8, second cargo, such as a second pallet or pallets of goods, is stowed on the floor 120 under the upper cargo deck 142. Stowing the second cargo can comprise causing the rear cargo lift 128 to move the second cargo within the cargo area 108 from the first elevation E to the floor 120 of the trailer 100 so as to load the second cargo below the upper cargo deck 142. The second cargo can be moved one pallet, or just a few pallets, at a time. For example, the second cargo can be moved, such as rolled or translated, from the dock 200 onto the platform 130 of the rear cargo lift 128. The ramp 138 of the rear cargo lift 128 can be raised to the retracted position, and the rear cargo lift 128 can be lowered to the floor 120 of the trailer 100. The second cargo can then be moved, such as rolled or translated, from the platform 130 to the lower cargo area 124 below the upper cargo deck 142. This process can be repeated until the lower cargo area 124 below the upper cargo deck 142 is full. Movements of the rear cargo lift 128 can be controlled by the interior control panel 172.

In FIG. 9, third cargo is stowed on the second platform section 134 of the rear cargo lift 128 at the floor 120. Stowing the third cargo can comprise causing the rear cargo lift 128 to move the third cargo within the cargo area 108 from the first elevation $E_1$ to the floor 120 of the trailer 100, and decoupling the second platform section 134 from the first platform section 132 so that the first platform section 132 can move independently of the second platform section 134. This step can be excluded in embodiments that do not employ rear cargo lift 128 having a split platform 130.

In FIG. 9, fourth cargo is additionally or alternatively stowed on the second upper cargo deck 148. Stowing the fourth cargo can comprise causing the second upper cargo deck 148 to move from a retracted position to a deployed position such that the second upper cargo deck 148 is disposed at the third elevation $E_3$, and causing the first platform section 132 of the rear cargo lift 128 to move the fourth cargo within the cargo area 108 from the first elevation $E_1$ to the third elevation $E_3$. The fourth cargo can then be moved from the rear cargo lift 128 to the second upper cargo deck 148. Note that, in alternative embodiments, the fourth cargo can be stowed before the third cargo. Further, in alternative embodiments, the second upper cargo deck 148 can be configured to move to the first elevation $E_1$ so as to receive the fourth cargo from the rear cargo lift 128 at the first elevation $E_1$. Although the ramp 138 is shown in the retracted position as the rear cargo lift 128 is moved to the third elevation $E_3$, the ramp 138 could alternatively be in the extended position as the rear cargo lift 128 is moved to the third elevation $E_3$ so as to provide more room on the rear cargo lift 128.

In FIG. 10, fifth cargo is stowed on the first platform section 132 of the rear cargo lift 128 at the floor 120. Stowing the fifth cargo can comprise causing the first platform section 132 to move the fifth cargo within the cargo area 108 from the first elevation $E_1$ to the floor 120 of the trailer 100. This step can be controlled by the exterior control panel 170.

Another embodiment can comprise a method of unloading the trailer 100. Unloading the trailer 100 can comprise performing the loading steps above in reverse order. For example, referring to FIG. 10, the method can comprise moving cargo stowed on the first platform section 132 onto the dock 200. This step can comprise causing the first platform section 132 to move cargo stored thereon within the cargo area 108 from the floor 120 to the first elevation $E_1$ of the trailer 100, and moving, such as rolling or translating, the cargo onto the dock 200.

Referring to FIG. 9, the method can comprise moving the cargo stowed on the second upper cargo deck 148 onto the dock 200. This step can comprise causing the first platform section 132 of the rear cargo lift 128 to move to the third elevation $E_3$, moving cargo stored on the second upper cargo deck 148 onto the first platform section 132, moving the first platform section 132 to the first elevation $E_1$, and moving, such as rolling or translating, the cargo from the first platform section 132 onto the dock 200. This step can further comprise causing the second upper cargo deck 148 to move to a retracted position from a deployed position.

With continued reference to FIG. 9, the method can comprise moving the cargo stowed on the second platform section 134 onto the dock 200. This step can comprise causing the second platform section 134 to move from the floor 120 to the first elevation $E_1$ and moving, such as rolling or translating, the cargo stowed on the second platform section 134 to the dock 200. This step can further comprise coupling the second platform section 134 to the first platform section 132. This step can be excluded in embodiments that do not employ rear cargo lift 128 having a split platform 130.

Referring to FIG. 8, the method can comprise moving cargo stowed on the floor 120 under the upper cargo deck 142 to the dock 200. The step can comprise causing the rear cargo lift 128 to move to the floor 120 of the trailer 100 so as to load cargo stowed below the upper cargo deck 142 onto the rear cargo lift 128. The cargo can be moved one pallet, or just a few pallets, at a time. For example, the cargo can be moved, such as rolled or translated, from the floor 120 onto the platform 130 of the rear cargo lift 128. The rear cargo lift 128 can be raised to the first elevation $E_1$. The cargo can then be moved, such as rolled or translated, from the rear cargo lift 128 to the dock 200. This process can be repeated until the lower cargo area 124 below the upper cargo deck 142 is emptied. Movements of the rear cargo lift 128 can be controlled by the interior control panel 172.

Referring to FIG. 7, the method can comprise moving cargo stowed in at least one of the upper cargo deck 142 and the neck 160 onto the dock 200. This step can comprise lowering the upper cargo deck 142 to the first elevation $E_1$, and moving the rear cargo lift 128 to the first elevation $E_1$. The cargo can then be moved, such as rolled or translated, from at least one of the upper cargo deck 142 and the neck 160 onto the dock.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims are recited in a particular sequence with corresponding labeling, unless the claim recitations otherwise imply a particular sequence for implementing some or all of those elements, those elements are not necessarily intended to be limited to being implemented in that particular sequence.

What is claimed:

1. A truck trailer, comprising:
   a pair of independent axles that are spaced from one another along a lateral direction, the pair of independent axles supporting a pair of wheels;
   a cargo container supported by the pair of independent axles, the cargo container including a front end, a rear end that is opposite the front end along a longitudinal direction, first and second sides that oppose one another along the lateral direction, a top wall, and a floor that opposes the top wall along a vertical direction and is defined at a floor elevation that is below a top of each of the wheels, the cargo container defining a cargo area between the front and rear ends, between the first and second sides, and between the top wall and floor;
   a rear cargo lift comprising a platform disposed within the cargo area at the rear end, the platform configured to move along the vertical direction from the floor elevation to a first elevation that is above the floor elevation so as to carry cargo between the floor elevation and the first elevation; and
   an upper cargo deck supported within a portion of the cargo area that is between the rear cargo lift and the front end, the upper cargo deck dividing the portion of the cargo area into an upper cargo area and a lower cargo area, at least a portion of the lower cargo area being disposed at the floor elevation between the pair of wheels with respect to the lateral direction, wherein the upper cargo deck is configured to align with the rear cargo lift at the first elevation so as to receive cargo into the upper cargo area, and to translate the received cargo to a second elevation that is above the first elevation such that additional cargo can be received in the lower cargo area.

2. The truck trailer of claim 1, wherein the platform of the rear cargo lift comprises a first platform section and a second platform section, each of the first platform section and the second platform section having forward and rearward ends that are offset from one another along the longitudinal direction, the forward end of the first platform section being removeably coupled to the rearward end of the second platform section such that the first and second platform sections can be separated from one another.

3. The truck trailer of claim 1, wherein the rear cargo lift comprises a ramp that is coupled to the platform, the ramp being configured to move between an extended position, wherein the ramp extends outward from the rear end of the cargo container along the longitudinal direction, and a retracted position, wherein the ramp is retracted relative to the rear end of the cargo container.

4. The truck trailer of claim 1, further comprising a second upper cargo deck supported in a portion of the cargo area that is between the platform and the upper cargo deck, the second upper cargo deck being configured to move between a deployed position, wherein the second upper cargo deck is configured to support cargo, and a retracted position, wherein the second upper cargo deck is moved from a pathway in which the upper cargo deck is loaded.

5. The truck trailer of claim 1, wherein the floor of the cargo container is continuously defined at the floor elevation from a rear end of the rear cargo lift to a front end of the upper cargo deck.

6. The truck trailer of claim 1, wherein a front end of the upper cargo deck comprises a gate that is configured to open and close.

7. A truck trailer, comprising:
   at least one axle configured to support at least one pair of wheels;
   a cargo container supported by the at least one axle and defining a cargo area therein, the cargo container comprising a floor, sidewalls extending from the floor, and a ceiling;
   a rear cargo lift comprising a platform disposed within the cargo area, the platform configured to move along a vertical direction from the floor of the cargo container to a first elevation that is above the floor; and
   an upper cargo deck comprising a bottom surface having a substantially planar shape, sidewalls extending upward from the bottom surface, and a gate that is configured to open and close, wherein the upper cargo deck is supported within a portion of the cargo area that is forward of the rear cargo lift, the upper cargo deck dividing the portion of the cargo area into an upper cargo area and a lower cargo area, the upper cargo deck being configured to align with the rear cargo lift at the first elevation to receive cargo in the upper cargo area, and to translate the received cargo along the vertical direction to a second elevation that is above the first elevation such that additional cargo can be received in the lower cargo area.

8. The truck trailer of claim 7, wherein the platform of the rear cargo lift comprises a first platform section and a second platform section, each of the first platform section and the second platform section having forward and rearward ends that are offset from one another, the forward end of the first platform section being removeably coupled to the rearward end of the second platform section such that the first and second platform sections can be separated from one another.

9. The truck trailer of claim 7, wherein the rear cargo lift comprises a ramp that is coupled to the platform such that the ramp is configured to move along the vertical direction with the platform, the ramp being configured to move between an extended position, wherein the ramp extends outward from a rear end of the cargo container, and a retracted position, wherein the ramp is retracted relative to the rear end of the cargo container.

10. The truck trailer of claim 7, further comprising a second upper cargo deck supported in a portion of the cargo area that is between the platform and the upper cargo deck, the second upper cargo deck being configured to move between a deployed position, wherein the second upper cargo deck is configured to support cargo, and a retracted position, wherein the second upper cargo deck is moved away from a pathway in which the upper cargo deck is loaded.

11. The truck trailer of claim 7, wherein the truck trailer has a neck that extends from a front end of the truck trailer rearwards towards the upper cargo deck, the neck having a neck floor at the first elevation.

12. The truck trailer of claim 7, wherein the at least one axle comprises at least one pair of independent axles that are spaced from one another along a lateral direction.

13. The truck trailer of claim 7, wherein the floor of the cargo container is defined at a continuous floor elevation from a rear end of the rear cargo lift to a front end of the upper cargo deck, the continuous floor elevation being below a top of each of the wheels.

14. The truck trailer of claim 7, further comprising a plurality of rails, wherein the upper cargo deck is configured to translate along the rails.

15. A method of loading cargo onto a trailer of a truck, the method comprising:
   aligning a rear cargo lift of the trailer with an upper cargo deck of the trailer at a first elevation to enable first cargo to move along the first elevation within a cargo area of the trailer;
   raising, after aligning the rear cargo lift of the trailer with the upper cargo deck of the trailer, the upper cargo deck within the cargo area to a second elevation that is above the first elevation;
   lowering, after raising the upper cargo deck to the second elevation, the rear cargo lift, with second cargo supported thereon, from the first elevation to a floor of the trailer to enable the second cargo to move along the floor below the upper cargo deck, the floor being defined at a floor elevation that is below a top of wheels;
   raising, after lowering the rear cargo lift, the rear cargo lift from the floor elevation to the first elevation to receive third cargo on a second platform section of the rear cargo lift;
   decoupling the second platform section of the rear cargo lift from a first platform section of the rear cargo lift; and
   lowering the second platform section of the rear cargo lift, with third cargo supported thereon, from the first elevation to the floor elevation of the trailer.

16. The method of claim 15, wherein aligning the rear cargo lift of the trailer with the upper cargo deck of the trailer comprises raising or lowering the upper cargo deck of the trailer to the first elevation within the cargo area.

17. The method of claim 15, wherein aligning the rear cargo lift of the trailer with the upper cargo deck of the trailer comprises rotating a ramp of the rear cargo lift from a retracted position to an extended position in which the ramp extends outwardly from a rear end of the trailer.

18. The method of claim 15, wherein the first cargo is moved across the upper cargo deck and into a neck of the trailer, the neck having a neck floor at the first elevation.

19. The method of claim 15, wherein the floor elevation is continuous from a rear end of the rear cargo lift to a front end of the upper cargo deck.

\* \* \* \* \*